(12) United States Patent
Liao et al.

(10) Patent No.: US 11,423,861 B2
(45) Date of Patent: Aug. 23, 2022

(54) METHOD FOR REDUCING REQUIRED TIME OF SCANNING A PLURALITY OF TRANSMISSION PORTS AND SCANNING SYSTEM THEREOF

(71) Applicant: QISDA CORPORATION, Taoyuan (TW)

(72) Inventors: Jen-Hao Liao, Taoyuan (TW); Tse-Wei Fan, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 24 days.

(21) Appl. No.: 16/734,388

(22) Filed: Jan. 5, 2020

(65) Prior Publication Data

US 2020/0211497 A1 Jul. 2, 2020

(30) Foreign Application Priority Data

Dec. 27, 2018 (CN) .......................... 201811609388.X (51) Int. Cl.
*G09G 5/00* (2006.01)
*G06F 13/40* (2006.01)

(52) U.S. Cl.
CPC .......... *G09G 5/006* (2013.01); *G06F 13/4022* (2013.01); *G09G 2330/022* (2013.01); *G09G 2370/10* (2013.01); *G09G 2370/12* (2013.01); *G09G 2370/22* (2013.01)

(58) Field of Classification Search
CPC ............. G09G 5/006; G09G 2330/022; G09G 2370/10; G09G 2370/12; G09G 2370/22; G06F 13/4022
See application file for complete search history.

(56) References Cited

U.S. PATENT DOCUMENTS

| | | | | |
|---|---|---|---|---|
| 9,477,437 B2* | 10/2016 | Ferry | ...................... | G09G 5/006 |
| 10,163,422 B1* | 12/2018 | Howell | .................. | G09G 5/006 |
| 2009/0185076 A1* | 7/2009 | Chen | ...................... | G09G 5/006 348/558 |
| 2010/0118193 A1* | 5/2010 | Boyden | .................. | G09G 5/006 348/554 |
| 2010/0138535 A1* | 6/2010 | Jerrim | ................. | H04L 63/1416 709/224 |
| 2011/0090400 A1* | 4/2011 | Huang | ................... | G09G 5/006 348/554 |
| 2012/0030381 A1* | 2/2012 | Singh | .................. | G06F 13/4295 710/16 |
| 2014/0112131 A1* | 4/2014 | Todaka | ............... | H04L 47/2433 370/230 |
| 2014/0240380 A1* | 8/2014 | Lee | .......................... | G09G 5/10 345/691 |
| 2014/0320510 A1* | 10/2014 | Ramachandran | ...... | G09G 5/006 345/520 |
| 2014/0365701 A1* | 12/2014 | Naruse | .................. | G06F 1/1632 710/304 |

(Continued)

*Primary Examiner* — Henry Tsai
*Assistant Examiner* — Aurangzeb Hassan (57) ABSTRACT

A method includes sorting a plurality of scanning time lengths of the plurality of transmission ports in an ascending order, generating a scanning priority table after the plurality of scanning time lengths of the plurality of transmission ports are sorted, and scanning at least two transmission ports according to the scanning priority table. A transmission port with a higher priority has a shorter scanning time length. A transmission port with a lower priority has a longer scanning time length.

19 Claims, 3 Drawing Sheets

(56) References Cited

U.S. PATENT DOCUMENTS

| | | | |
|---|---|---|---|
| 2016/0219226 A1* | 7/2016 | Kuo | G09G 5/006 |
| 2017/0256192 A1* | 9/2017 | Knepper | G09G 3/2092 |
| 2018/0197501 A1* | 7/2018 | Veeramani | H04N 21/4122 |
| 2019/0235809 A1* | 8/2019 | Kotake | G06F 3/1232 |
| 2020/0154294 A1* | 5/2020 | Dhanuka | H04M 1/72469 |
| 2020/0326769 A1* | 10/2020 | Ansari | G09G 5/006 |

* cited by examiner

METHOD FOR REDUCING REQUIRED TIME OF SCANNING A PLURALITY OF TRANSMISSION PORTS AND SCANNING SYSTEM THEREOF

BACKGROUND OF THE INVENTION

1. Field of the Invention

The present invention illustrates a method for reducing required time of scanning a plurality of transmission ports and a scanning system, and more particularly, a method and a scanning system capable of reducing the required time of scanning the plurality of transmission ports according to a scanning priority table.

2. Description of the Prior Art

With the developments of technologies, various multi-functional and multi-input/output (IO) based display devices have been widely adopted in our daily life. Nowadays, the display device can support a plurality of transmission ports for receiving audio signals and video signals with various communications standards. For example, the display device can support a video graphics array (VGA) transmission port, a high definition multimedia interface (HDMI) transmission port, a display port (DP), and a digital visual interface (DVI) transmission port, and/or a mini display port (Mini-DP). These transmission ports can receive display signals with different bandwidths, different communications protocols, and different transmission modes. For example, a VGA communications standard is a computer communications standard proposed in 1987 for processing an analog signal. Since the VGA communications standard is a relatively old communications standard, a bandwidth (or say, a channel capacity) supported by the VGA communications standard is small. Therefore, the VGA communications standard can only be applied to transmit data of an image with a low resolution (i.e., about 640×480 pixels). An HDMI communications standard can be regarded as an interface for processing digital audio signals and digital video signals. The HDMI communications standard can be applied to a set-top box, a personal computer, and a digital speaker. Since the HDMI communications standard is a relatively new communications standard, a bandwidth supported by the HDMI communications standard is large. Thus, the HDMI communications standard can be applied to transmit data of an image with a high resolution (i.e., about 1920×1080 pixels).

Since the display device can support the plurality of transmission ports, when no data signal is received by the display device for a period of time, the display device can perform a "polling process" for detecting if a data signal is subsequently received by any of the transmission ports. After the polling process is performed, if no data signal is detected, the display device can enter a sleep mode for saving power. However, in conventional display devices, the polling process is irrelevant to configurations of the transmission ports, such as bandwidths, user preferences, and scanning time lengths. In the conventional display devices, the polling process is not optimized. Therefore, the conventional display devices may take a lot of time for detecting a presence or stability of the data signal. In other words, in the conventional display devices, a waiting time of the user may be increased due to an excessive polling time.

SUMMARY OF THE INVENTION

In an embodiment of the present invention, a method for reducing required time of scanning a plurality of transmission ports is disclosed. The method comprises sorting a plurality of scanning time lengths of the plurality of transmission ports in an ascending order, generating a scanning priority table after the plurality of scanning time lengths of the plurality of transmission ports are sorted, and scanning at least two transmission ports according to the scanning priority table. A transmission port with a higher priority has a shorter scanning time length. A transmission port with a lower priority has a longer scanning time length.

In another embodiment of the present invention, a scanning system is disclosed. The scanning system comprises a display device and a signal source. The display device comprises a plurality of transmission ports, a memory, and a processor. The plurality of transmission ports are used for receiving at least one data signal. The memory is used for saving scanning data of the plurality of transmission ports. The processor is coupled to the plurality of transmission ports and the memory for scanning at least two transmission ports. The signal source is coupled to at least one transmission port of the plurality of transmission ports for generating the at least one data signal to the display device. The processor sorts a plurality of scanning time lengths of the plurality of transmission ports in an ascending order, generates a scanning priority table after the plurality of scanning time lengths of the plurality of transmission ports are sorted, and scans the at least two transmission ports according to the scanning priority table. A transmission port with a higher priority has a shorter scanning time length. A transmission port with a lower priority has a longer scanning time length.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
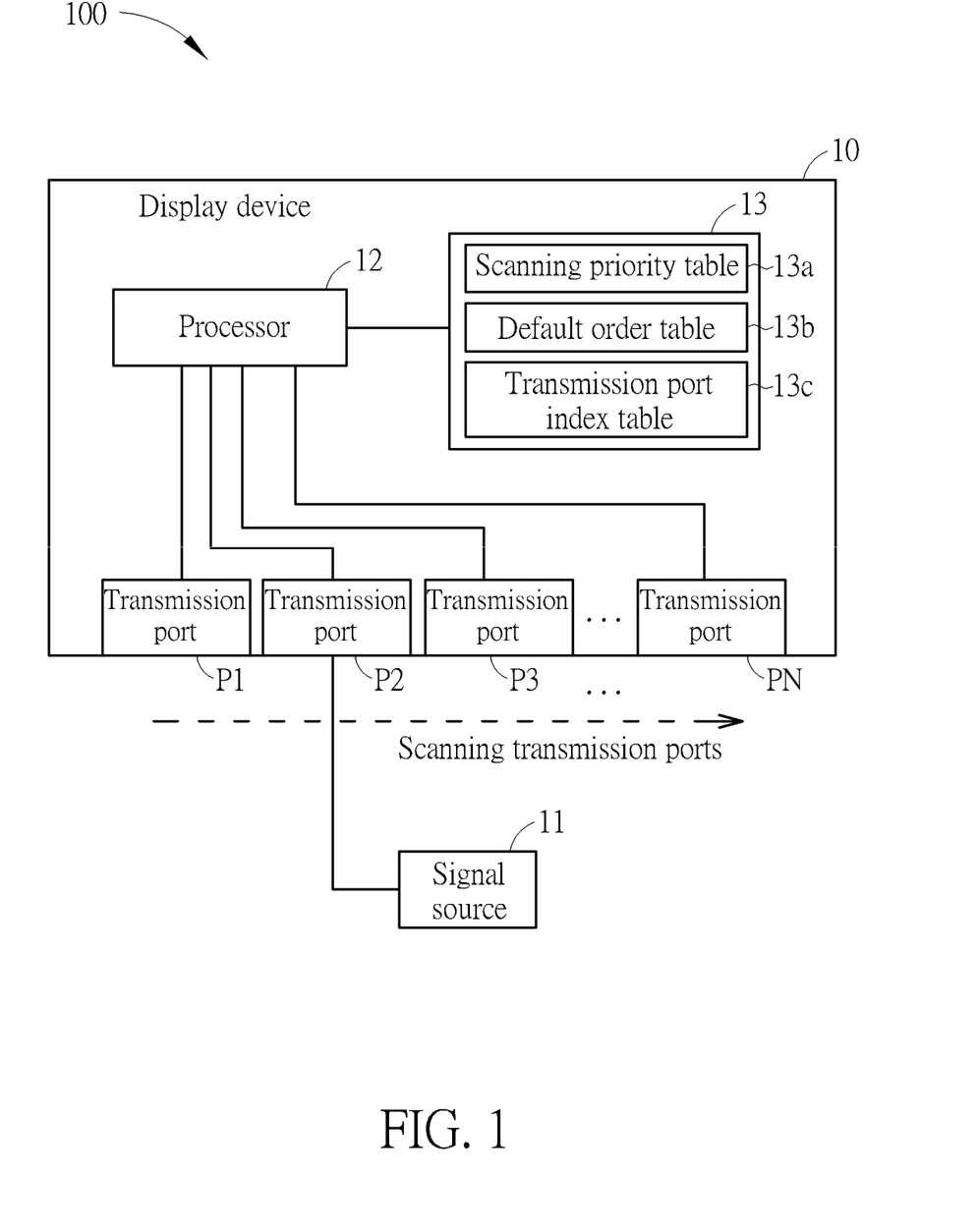
FIG. 1 is a block diagram of a scanning system according to an embodiment of the present invention.

FIG. 1 is a block diagram of a scanning system 100 according to an embodiment of the present invention. The scanning system 100 includes a display device 10 and a signal source 11. The display device 10 can be any display device having a plurality of transmission ports. In FIG. 1, the display device 10 includes a plurality of transmission ports P1 to PN, a processor 12, and a memory 13. The plurality of transmission ports P1 to PN can be regarded as data ports supporting various communications standards, such as a video graphics array (VGA) transmission port, a high definition multimedia interface (HDMI) transmission port, and a display port (DP), a digital visual interface (DVI) transmission port, and/or a mini display port (Mini-DP). The plurality of transmission ports P1 to PN can be used for receiving at least one data signal. Any reasonable communications standard of each transmission port falls into the scope of the present invention. In other words, the plurality of transmission ports P1 to PN can receive data signals having Q communications standard formats. N and Q are two positive integers greater than one. N is greater than or equal to Q. The memory 13 is used for saving scanning data of the plurality of transmission ports P1 to PN, such as a scanning priority table 13a, a default order table 13b, and a transmission port index table 13c. Details of the scanning priority table 13a, the default order table 13b, and the transmission port index table 13c are illustrated later. The memory 13 can be any memory device, such as an electrically-erasable programmable read-only memory (EEPROM), a non-volatile memory, or a hard disk. The processor 12 is coupled to the plurality of transmission ports P1 to PN and the memory 13 for scanning at least one transmission port of the plurality of transmission ports P1 to PN. The processor 12 can be any programmable component, such as a scaler, a central processing unit (CPU), or a microprocessor. The signal source 11 is coupled to at least one transmission port of the plurality of transmission ports P1 to PN for generating the at least one data signal to the display device 10. The signal source 11 can be a video data signal generator, a multimedia player, a graphics card, or a set-top box. Further, the processor 12 can adjust scanning priorities of the transmission ports P1 to PN. In the scanning system 100, for example, when the signal source 11 stably transmits a data signal to a certain transmission port (i.e., for example, the transmission port P2), the processor can rapidly detect and receive the data signal through the transmission port P2. After the data signal is received by the processor 12 through the transmission port P2, the processor 12 can provide video functions for the user accordingly. Therefore, for the user, since the scanning system 100 can rapidly detect the transmission port currently used, the operation efficiency can be increased.

In the scanning system 100, the processor 12 can sort a plurality of scanning time lengths of the plurality of transmission ports P1 to PN in an ascending order. After the plurality of scanning time lengths of the plurality of transmission ports P1 to PN are sorted, the processor 12 can generate the scanning priority table 13a accordingly. The scanning priority table 13a can include priorities of the plurality of transmission ports P1 to PN. Further, a transmission port with a higher priority has a shorter scanning time length. A transmission port with a lower priority has a longer scanning time length. Then, the processor 12 can scan at least one transmission port according to the scanning priority table. Details of generating the scanning priority table 13a by sorting the plurality of scanning time lengths of the plurality of transmission ports P1 to PN are illustrated later.

In the scanning system 100, a method for generating the scanning priorities of the transmission ports P1 to PN is relevant to the scanning time lengths of the transmission ports P1 to PN. Therefore, the processor 12 can acquire the scanning time length of each transmission port of the plurality of transmission ports P1 to PN. The scanning time length of a transmission port can be a predetermined value or a manually measured value. Further, in the scanning system 100, the scanning time length of a transmission port can be defined as a time difference between a first time of triggering a hot-plugging state of the transmission port and a second time of stably receiving the data signal by the transmission port. Details of a method for acquiring the scanning time length of a transmission port are illustrated later.

Figure 2:
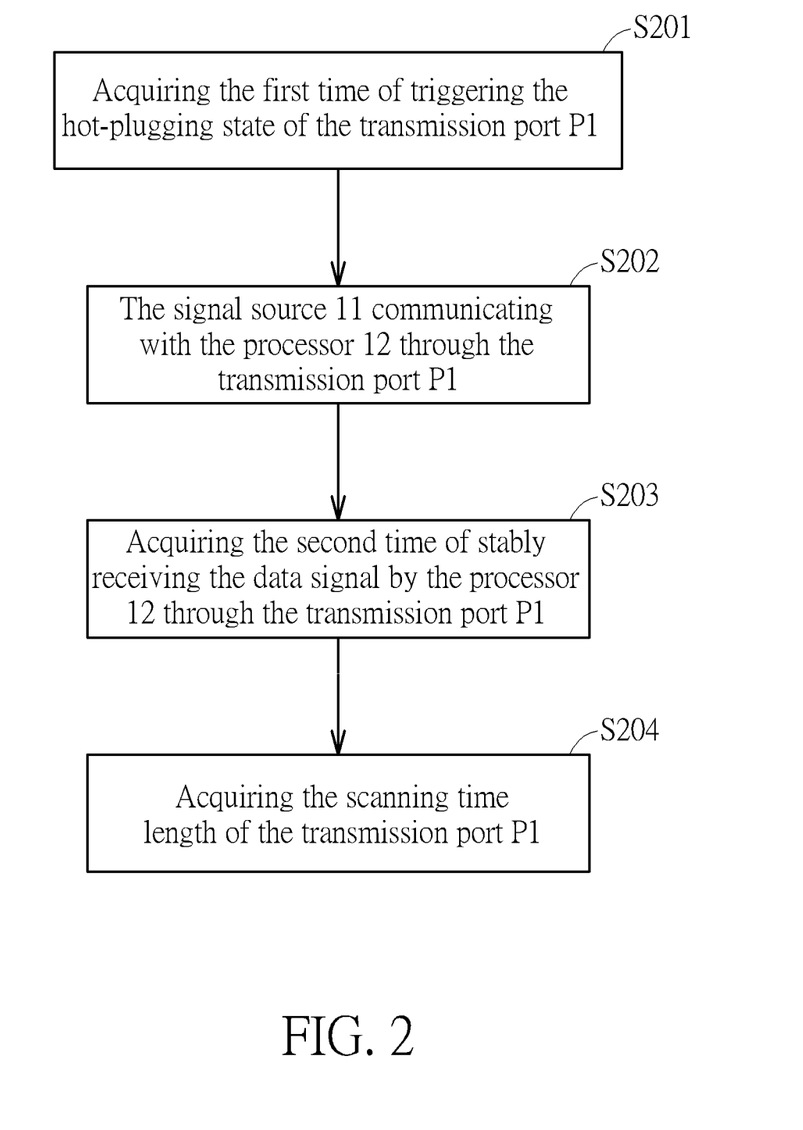
FIG. 2 is a flowchart of a method for acquiring a scanning time length of a single transmission port of the scanning system in FIG. 1.

FIG. 2 is a flow chart of the method for acquiring the scanning time length of a transmission port of the scanning system 100. The method for acquiring the scanning time length of the single transmission port includes step S201 to step S204. Any reasonable technology modification falls into the scope of the present invention. Further, for simplicity, a transmission port P1 is introduced to step S201 to step S204. Step S201 to step S204 are illustrated below.

step S201: acquiring the first time of triggering the hot-plugging state of the transmission port P1;
step S202: the signal source 11 communicating with the processor 12 through the transmission port P1;
step S203: acquiring the second time of stably receiving the data signal by the processor 12 through the transmission port P1;
step S204: acquiring the scanning time length of the transmission port P1.

When the user wants to acquire the scanning time length of the transmission port P1, the user can connect a cable line of the signal source 11 with the transmission port P1 of the display device 10. After the cable line of the signal source 11 is connected with the transmission port P1, the processor 12 of the display device 10 can generate a hot-plugging signal. Thus, the processor can acquire the first time of triggering the hot-plugging state of the transmission port P1 according to step S201. Then, the signal source 11 can communicate with the processor 12 through the transmission port P1 according to step S202. Here, a communications mode of the signal source 11 to the processor 12 through the transmission port P1 can be a unidirectional communications mode or a bidirectional communications mode. After the signal source 11 successfully establishes a data link with the processor 12, the signal source 11 can output the data signal (i.e., a video signal) to the transmission port P1. Therefore, in step S203, the processor 12 can acquire the second time of stably receiving the data signal by the processor 12 through the transmission port P1. Also, the processor 12 can be delayed for a period of time (i.e., 0.5 seconds) to generate the second time after the data signal is stably received by the transmission port P1. In step S204, the processor 12 can acquire the scanning time length of the transmission port P1. Here, the scanning time length can be defined as the time difference between the first time and the second time. In the following, a method for detecting scanning time lengths of some transmission ports commonly used is illustrated below.

When the transmission port P1 is a video graphics array (VGA) transmission port, the processor 12 can acquire a third time of triggering the hot-plugging state of the VGA transmission port. Further, the VGA transmission port is categorized as an analog signal based transmission port. The VGA transmission port only supports unidirectional communications. Therefore, the processor 12 can communicate with the signal source 11 through the VGA transmission port by using a vertical synchronization signal (Vsync). As previously mentioned, since the VGA transmission port only supports the unidirectional communications, the vertical synchronization signal can be transmitted from the signal source 11 to the processor 12. In other words, the VGA transmission port can be regarded as a circuit for receiving the data signal having a VGA format generated from the signal source 11. Then, the processor 12 can acquire a fourth time of stably receiving the data signal through the VGA transmission port. Further, the processor 12 can acquire a scanning time length of the VGA transmission port according to a time difference between the third time and the fourth time.

When the transmission port P1 is a high definition multimedia interface (HDMI) transmission port, the processor 12 can acquire a fifth time of triggering the hot-plugging state of the HDMI transmission port. As previously mentioned, the HDMI transmission port supports the bidirectional communications of the digital audio signals and digital video signals. Therefore, the processor 12 can communicate with the signal source 11 through the HDMI transmission port by using a clock signal carried by an inter-integrated circuit (I²C) bus. The HDMI transmission port can be regarded as a circuit for receiving the data signal having an HDMI format generated from the signal source 11. Then, the processor 12 can acquire a sixth time of stably receiving the data signal through the HDMI transmission port. Further, the processor 12 can acquire a scanning time length of the HDMI transmission port according to a time difference between the fifth time and the sixth time.

When the transmission port P1 is a display port (DP), the processor 12 can acquire a seventh time of triggering the hot-plugging state of the DP. Further, the DP supports the bidirectional communications of digital signals. Therefore, the processor 12 can communicate with the signal source 11 through the DP by using a packet signal carried by an auxiliary channel. The DP can be regarded as a circuit for receiving the data signal having a DP format generated from the signal source 11. Then, the processor 12 can acquire an eighth time of stably receiving the data signal through the DP. Further, the processor 12 can acquire a scanning time length of the DP according to a time difference between the seventh time and the eighth time.

After the scanning time lengths of the plurality of transmission ports P1 to PN are manually or automatically acquired, the processor 12 can sort the plurality of scanning time lengths of the plurality of transmission ports P1 to PN in an ascending order, as illustrated in Table 1.

TABLE 1

| transmission port P1' | scanning time length: S1 seconds |
|---|---|
| transmission port P2' | scanning time length: S2 seconds |
| transmission port P3' | scanning time length: S3 seconds |
| . | . |
| . | . |
| . | . |
| transmission port PN' | scanning time length: SN seconds |

In Table 1, a scanning time length of the transmission port P1' is S1 seconds. A scanning time length of the transmission port P2' is S2 seconds. A scanning time length of the transmission port PN' is SN seconds. Further, the scanning time lengths satisfy a correlation of S1<S2<S3 . . . <SN. In other words, in Table 1, the scanning time lengths can be sorted from a shortest scanning time length S1 to a longest scanning time length SN. Therefore, the processor 12 can generate the scanning priority table 13*a* after the scanning time lengths are sorted. Here, the scanning priority table 13*a* can be shown as:

| Scanning priority table 13a | | | | |
|---|---|---|---|---|
| transmission port index | P1' | P2' | P3' | . . . | PN' |

Priorities of the transmission ports P1 to PN can be generated by the processor 12 in the display device 10. For avoiding ambiguity, the transmission port P1' is defined as a transmission port with a highest priority. The transmission port PN' is defined as a transmission port with a lowest priority. The scanning time length S1 of the transmission port P1' is short. The scanning time length SN of the transmission port PN' is long. The processor 12 can scan at least one transmission port according to the scanning priority table 13*a*. For example, the transmission port P1' can be the VGA transmission port, corresponding to a scanning time length of 0.5 seconds. The transmission port P2' can be the DVI transmission port, corresponding to a scanning time length of 2 seconds. The transmission port P3' can be the HDMI transmission port, corresponding to a scanning time length of 3 seconds. The transmission port P4' can be the DP, corresponding to a scanning time length of 4 seconds. The processor can sequentially scan the VGA transmission port, the DVI transmission port, the HDMI transmission port, and the DP. By doing so, since transmission ports with shorter scanning time lengths are scanned before transmission ports with longer scanning time lengths, the processor 12 can complete scanning transmission ports with shorter scanning time lengths in a short time. Once the processor 12 detects the data signal received by a certain transmission port, the processor 12 can provide video functions immediately for the user to enhance visual experience. In the following, an expected value (or say, mean value) of the scanning time lengths of the scanning system 100 is mathematically illustrated below.

As previously mentioned, the transmission port P1' can be the VGA transmission port, corresponding to a scanning time length of 0.5 seconds. The transmission port P2' can be the DVI transmission port, corresponding to a scanning time length of 2 seconds. The transmission port P3' can be the HDMI transmission port, corresponding to a scanning time length of 3 seconds. The transmission port P4' can be the DP, corresponding to a scanning time length of 4 seconds. The processor 12 can sequentially scan the VGA transmission port, the DVI transmission port, the HDMI transmission port, and the DP. Therefore, accumulated scanning time lengths (i.e., waiting time lengths) for four transmission ports can be shown in Table 2.

TABLE 2

| transmission port | VGA | DVI | HDMI | DP |
|---|---|---|---|---|
| accumulated scanning time length (seconds) | 0.5 | 0.5 + 2 = 2.5 | 2.5 + 3 = 5.5 | 5.5 + 4 = 9.5 |

In Table 2, an average waiting time length can be defined as an average accumulated scanning time length, which can be derived as (0.5+2.5+5.5+9.5)/4=4.5. In other words, the processor 12 can be expected to require about 4.5 seconds for completing the scan process in Table 2. The user only needs to wait 4.5 seconds for enjoying the visual experience. For example, in a best case, the VGA transmission port receives the data signal (i.e., one port is scanned). Awaiting time length for the user is equal to 0.5 seconds. In a worst case, the DP receives the data signal (i.e., four ports are scanned). A waiting time length for the user is equal to 9.5 seconds. However, the average waiting time length for the user is equal to 4.5 seconds.

Further, in the scanning system 100, the processor 12 can be used for editing the scanning priority table 13*a* for generating an updated scanning priority table. Then, the processor 12 can scan at least one transmission port of all transmission ports according to the updated scanning priority table. In other words, the scanning priority table 13*a* of the scanning system 100 can be customized.

Since the scanning system 100 can be applied to an advanced display system, combinations and types of the transmission ports may be more complicated. Therefore, the scanning priority table 13a of the scanning system 100 can be optimized, as illustrated below. In the previously mentioned Table 1, the scanning system 100 can include the transmission port P1' and the transmission port P2'. However, it is assumed that the scanning time length S1 of the transmission port P1' and the scanning time length S2 of the transmission port P2' are almost identical, as shown in Table 3.

TABLE 3

| transmission port P1' | scanning time length: S1 seconds |
| transmission port P2' | scanning time length: S2≈S1 seconds |

Here, the scanning data of the memory 13 can include the default order table 13b of the transmission port P1' and the transmission port P2'. The processor 12 can optionally adjust priorities of scanning the transmission port P1' and the transmission port P2' in the scanning priority table 13a according to the default order table 13b. Here, the transmission port P1' and the transmission port P2' are two transmission ports with different communications standards. For example, the transmission port P1' is the VGA transmission port. The transmission port P2' is the DVI transmission port. Further, the default order table 13b of the memory 13 can be generated according to bandwidths of all communications standards of the transmission ports, or generated according to user-defined configurations, as illustrated in Table 4.

TABLE 4

| communications standards of the transmission ports | default scanning order |
|---|---|
| DP | first |
| Mini-DP | Second |
| HDMI | Third |
| DVI | fourth |
| VGA | fifth |

In Table 4, when a transmission port has a higher default priority, it implies that the transmission port can support higher bandwidth. When a transmission port has a lower default priority, it implies that the transmission port only supports a lower bandwidth. Here, transmission ports in Table 4 satisfy a correlation of DP bandwidth>Mini-DP bandwidth>HDMI bandwidth>DVI bandwidth>VGA bandwidth. As previously mentioned, it is assumed that the scanning time length of the transmission port P1' (VGA) is substantially equal to the scanning time length of the transmission port P2' (DVI). Here, a default priority of the DVI communications standard is higher than a default priority of the VGA communications standard. Therefore, the processor 12 can scan the transmission port P2' first. After the transmission port P2' is scanned, the processor 12 scans the transmission port P1'. Further, the "default scanning order" in Table 4 can be adjusted. For example, the user can arbitrarily adjust the default scanning order in Table 4 according to preference configurations or requirements. Since the priorities of some transmission ports can be appropriately adjusted, the scanning priority table 13a can be optimized. Any reasonable method for optimizing priorities of the scanning priority table 13a according to the default order table 13b falls into the scope of the present invention.

As previously mentioned, the scanning system 100 can be applied to the advanced display system. Since combinations and types of the transmission ports may be more complicated, some transmission ports may have the same communications standards. Therefore, the scanning priority table 13a of the scanning system 100 can be optimized, as illustrated below. In the previously mentioned Table 1, the scanning system 100 can include some transmission ports having the same communications standards, as categorized in Table 5.

TABLE 5

| communications standards of the transmission ports | transmission ports index orders |
|---|---|
| DP | $DP_1, DP_2, \ldots, DP_X$ |
| Mini-DP | $MDP_1, MDP_2, \ldots, MDP_Y$ |
| HDMI | $HDMI_1, HDMI_2, \ldots, HDMI_Z$ |

In FIG. 5, the scanning system 100 includes X transmission ports having the DP communications standard, denoted as $DP_1, DP_2, \ldots, DP_X$. The scanning system 100 includes Y transmission ports having the Mini-DP communications standard, denoted as $MDP_1, MDP_2, \ldots, MDP_Y$. The scanning system 100 includes Z transmission ports having the HDMI communications standard, denoted as $HDMI_1$, $HDMI_2, \ldots, HDMI_Z$. Particularly, the communications standards of the transmission ports (DP, Mini-DP, and HDMI) and the transmission ports index orders of all communications standards form the transmission port index table 13c. The transmission port index table 13c can be saved in the memory 13. X, Y, and Z are three positive integers. The processor 12 can optionally adjust priorities of some transmission ports having the same communications standards according to the transmission port index table 13c. Since the priorities of some transmission ports can be appropriately adjusted, the scanning priority table 13a can be optimized. For example, in Table 1, the transmission port P1' and the transmission port P2' have the same communications standards, such as DP communications standards. The transmission port P1' corresponds to a transmission port index $DP_1$. The transmission port P1' corresponds to a transmission port index $DP_2$. The processor 12 can scan the transmission port P1' first. After the transmission port P1' is scanned, the processor 12 scans the transmission port P2'. In other embodiments, the transmission port P1' corresponds to the transmission port index $DP_2$. The transmission port P2' corresponds to the transmission port index $DP_1$. The processor 12 can scan the transmission port P2' first. After the transmission port P2' is scanned, the processor 12 scans the transmission port P1'. In other words, the processor 12 can adjust priorities of scanning the transmission ports listed in the scanning priority table 13a according to the transmission port index table 13c. However, the transmission port index orders in Table 5 can be user-defined. Any reasonable method for optimizing priorities of the scanning priority table 13a according to the transmission port index table 13c falls into the scope of the present invention.

Figure 3:
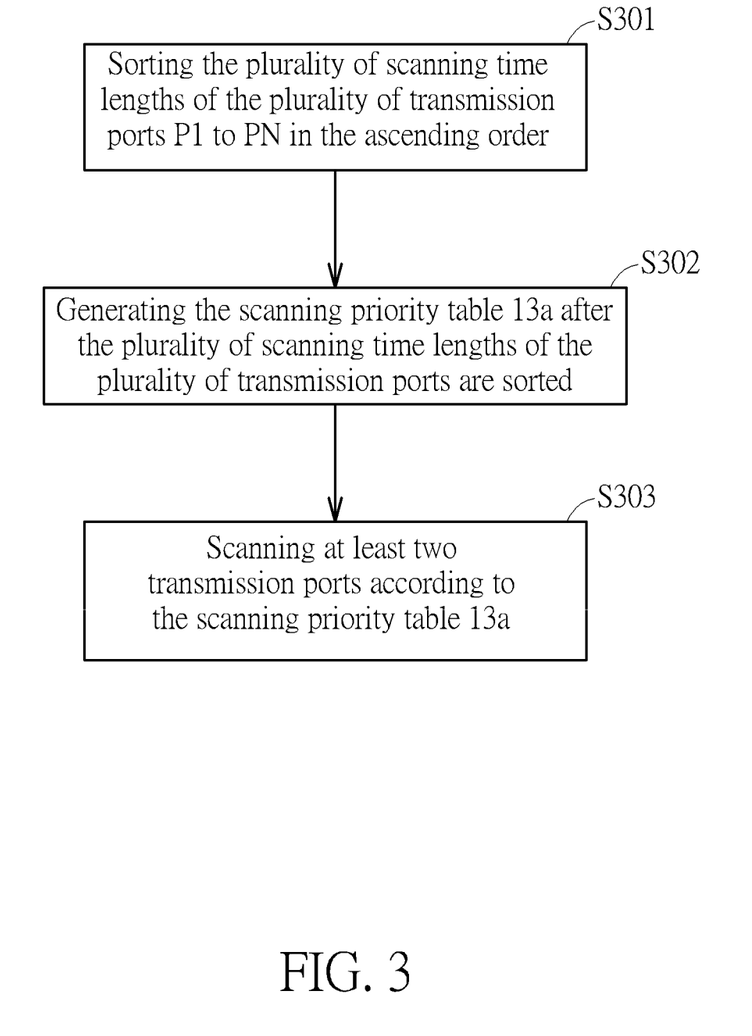
FIG. 3 is a flow chart of performing a method for reducing the required time of scanning a plurality of transmission ports of the scanning system in FIG. 1.

FIG. 3 is a flow chart of performing a method for reducing the required time of scanning the plurality of transmission ports of the scanning system 100. The method includes step S301 to step S303. Any reasonable technology modification falls into the scope of the present invention. Step S301 to step S303 are illustrated below.

step S301: sorting the plurality of scanning time lengths of the plurality of transmission ports P1 to PN in the ascending order;

step S302: generating the scanning priority table 13a after the plurality of scanning time lengths of the plurality of transmission ports are sorted;

step S303: scanning at least two transmission ports according to the scanning priority table 13a.

Details of step S301 to step S303 are previously illustrated. Thus, they are omitted here. However, at least one additional step can be appropriately introduced to the method. For example, when the processor 12 detects that the data signal is stably received by a transmission port, the processor 12 can suspend the scanning process and then provides video functions for the user. Further, after all transmission ports P1 to PN are completely scanned, the processor 12 can enter a sleep mode for saving power if no data signal is received by the transmission ports P1 to PN. By performing step S301 to step S303, the scanning system 100 can rapidly detect the transmission port currently receiving the data signal, thereby leading to a high operation efficiency.

To sum up, the present invention discloses a method for reducing the required time of scanning a plurality of transmission ports and a scanning system. The scanning system can sort the plurality of scanning time lengths of the plurality of transmission ports for generating a scanning priority table. The scanning system can perform a scanning process according to the scanning priority table. Since a transmission port with a higher priority has a shorter scanning time length, the scanning system can complete scanning some transmission ports with shorter scanning time lengths in a short time. Therefore, an average accumulated scanning time length (i.e., an average waiting time length) for all transmission ports can be reduced. In other words, the scanning system can reduce an image delay for providing a satisfactory visual experience and video functions for the user. Further, the scanning system can optimize the scanning priority table according to characteristics of the transmission ports. For example, when scanning time lengths of at least two transmission ports are almost identical, a default order table can be introduced to the scanning system for optimizing priorities of scanning the transmission ports. For example, when the scanning system includes some transmission ports having the same communications standards, a transmission port index table can be introduced to the scanning system for optimizing priorities of scanning the transmission ports. Therefore, the scanning system of the present invention is capable of performing a scanning process with a high efficiency. The scanning process can also be customized. Therefore, the scanning system of the present invention can reduce the image delay and can provide high operation flexibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reducing required time of scanning a plurality of transmission ports comprising:
    acquiring a scanning time length of each transmission port of the plurality of transmission ports;
    sorting a plurality of scanning time lengths of the plurality of transmission ports corresponding to at least two different protocols sequentially in an ascending order;
    generating a scanning priority table after the plurality of scanning time lengths of the plurality of transmission ports are sorted; and
    scanning at least two transmission ports according to the scanning priority table;
    wherein the scanning time length of the each transmission port is a time difference between a first time of triggering a hot-plugging state of the each transmission port and a second time of stably receiving a data signal by the each transmission port, a transmission port with a higher priority has a shorter scanning time length, and a transmission port with a lower priority has a longer scanning time length; and
    wherein the transmission port with the higher priority is scanned before the transmission port with the lower priority is scanned, and the scanning time length of the each transmission port is a predetermined value or a manually measured value.

2. The method of claim 1, further comprising:
    editing the scanning priority table for generating an updated scanning priority table; and
    scanning at least two transmission ports of the plurality of transmission ports according to the updated scanning priority table.

3. The method of claim 1, wherein the plurality of transmission ports comprise a first transmission port and a second transmission port, and the method further comprises:
    acquiring a default order table of the first transmission port and the second transmission port; and
    adjusting priorities of the first transmission port and the second transmission port according to the default order table when two scanning time lengths of the first transmission port and the second transmission port are almost identical.

4. The method of claim 3, wherein the first transmission port and the second transmission port are two transmission ports with different communications standards, and the default order table is generated according to bandwidths of the first transmission port and the second transmission port, or generated according to user-defined configurations.

5. The method of claim 4, wherein the plurality of transmission ports comprise a third transmission port and a fourth transmission port, and the method further comprises:
    acquiring a transmission port index table of the third transmission port and the fourth transmission port; and
    adjusting priorities of the third transmission port and the fourth transmission port according to the transmission port index table.

6. The method of claim 1, further comprising:
    after the plurality of transmission ports are completely scanned, entering a sleep mode if no data signal is received by the transmission ports.

7. The method of claim 1, wherein the plurality of transmission ports comprise a video graphics array (VGA) transmission port, and the method further comprises:
    acquiring a third time of triggering a hot-plugging state of the video graphics array transmission port;
    a signal source communicating with a processor through the video graphics array transmission port by using a vertical synchronization signal;
    acquiring a fourth time of stably receiving a data signal by the processor through the video graphics array transmission port;
    acquiring a scanning time length of the video graphics array transmission port according to a time difference between the third time and the fourth time; and
    acquiring other scanning time lengths of other transmission ports of the plurality of transmission ports.

8. The method of claim 7, wherein the plurality of transmission ports comprise a high definition multimedia interface (HDMI) transmission port, and the method further comprises:

acquiring a fifth time of triggering a hot-plugging state of the high definition multimedia interface transmission port;
a signal source communicating with a processor through the high definition multimedia interface transmission port by using a clock signal carried by an inter-integrated circuit (I²C) bus;
acquiring a sixth time of stably receiving a data signal by the processor through the high definition multimedia interface transmission port;
acquiring a scanning time length of the high definition multimedia interface transmission port according to a time difference between the fifth time and the sixth time; and
acquiring other scanning time lengths of other transmission ports of the plurality of transmission ports.

9. The method of claim 8, wherein the plurality of transmission ports comprise a display port (DP), and the method further comprises:
acquiring a seventh time of triggering a hot-plugging state of the display port;
a signal source communicating with a processor through the display port by using a packet signal carried by an auxiliary channel;
acquiring an eighth time of stably receiving a data signal by the processor through the display port;
acquiring a scanning time length of the display port according to a time difference between the seventh time and the eighth time; and
acquiring other scanning time lengths of other transmission ports of the plurality of transmission ports.

10. A scanning system comprising:
a display device comprising:
a plurality of transmission ports configured to receive at least one data signal;
a memory configured to save scanning data of the plurality of transmission ports; and
a processor coupled to the plurality of transmission ports and the memory and configured to scan at least two transmission ports; and
a signal source coupled to at least one transmission port of the plurality of transmission ports and configured to generate the at least one data signal to the display device;
wherein the processor acquires a scanning time length of each transmission port of the plurality of transmission ports, sorts a plurality of scanning time lengths of the plurality of transmission ports corresponding to at least two different protocols sequentially in an ascending order, generates a scanning priority table after the plurality of scanning time lengths of the plurality of transmission ports are sorted, and scans at least two transmission ports according to the scanning priority table, the scanning time length of the each transmission port is a time difference between a first time of triggering a hot-plugging state of the each transmission port and a second time of stably receiving a data signal by the each transmission port, a transmission port with a higher priority has a shorter scanning time length, and a transmission port with a lower priority has a longer scanning time length; and
wherein the scanning time length of the each transmission port is a predetermined value or a manually measured value.

11. The system of claim 10, wherein the plurality of transmission ports comprise a first transmission port and a second transmission port, the scanning data of the memory comprises a default order table of the first transmission port and the second transmission port, the processor adjusts priorities of the first transmission port and the second transmission port according to the default order table when two scanning time lengths of the first transmission port and the second transmission port are almost identical.

12. The system of claim 11, wherein the first transmission port and the second transmission port are two transmission ports with different communications standards, and the default order table is generated according to bandwidths of the first transmission port and the second transmission port, or generated according to user-defined configurations.

13. The system of claim 12, wherein the plurality of transmission ports comprise a third transmission port and a fourth transmission port, the scanning data of the memory comprises a transmission port index table of the third transmission port and the fourth transmission port, and the processor adjusts priorities of the third transmission port and the fourth transmission port according to the transmission port index table.

14. The system of claim 10, wherein after the plurality of transmission ports are completely scanned, the processor enters a sleep mode if no data signal is received by the transmission ports.

15. The system of claim 10, wherein the plurality of transmission ports comprise a video graphics array (VGA) transmission port, the processor acquires a third time of triggering a hot-plugging state of the video graphics array transmission port, communicates with a signal source through the video graphics array transmission port by using a vertical synchronization signal, acquires a fourth time of stably receiving a data signal through the video graphics array transmission port, and acquires a scanning time length of the video graphics array transmission port according to a time difference between the third time and the fourth time.

16. The system of claim 15, wherein the plurality of transmission ports comprise a high definition multimedia interface (HDMI) transmission port, the processor acquires a fifth time of triggering a hot-plugging state of the high definition multimedia interface transmission port, communicates with a signal source through the high definition multimedia interface transmission port by using a clock signal carried by an inter-integrated circuit (I²C) bus, acquires a sixth time of stably receiving a data signal through the high definition multimedia interface transmission port, and acquires a scanning time length of the high definition multimedia interface transmission port according to a time difference between the fifth time and the sixth time.

17. The system of claim 16, wherein the plurality of transmission ports comprise a display port (DP), the processor acquires a seventh time of triggering a hot-plugging state of the display port, communicates with a signal source through the display port by using a packet signal carried by an auxiliary channel, acquires an eighth time of stably receiving a data signal through the display port, and acquires a scanning time length of the display port according to a time difference between the seventh time and the eighth time.

18. A scanning system comprising:
a display device comprising:
a plurality of transmission ports configured to receive at least one data signal;
a memory configured to save scanning data of the plurality of transmission ports; and
a processor coupled to the plurality of transmission ports and the memory and configured to scan at least two transmission ports; and a signal source coupled to at least one transmission port of the plurality of transmission ports and configured to generate the at least one data signal to the display device;

wherein the processor sorts a plurality of scanning time lengths of the plurality of transmission ports corresponding to at least two different protocols sequentially, generates a scanning priority table after the plurality of scanning time lengths of the plurality of transmission ports are sorted, and scans at least two transmission ports according to the scanning priority table, a scanning time length of each transmission port is a time difference between a first time of triggering a hot-plugging state of the each transmission port and a second time of stably receiving a data signal by the each transmission port, a transmission port with a higher priority has a shorter scanning time length, and a transmission port with a lower priority has a longer scanning time length; and wherein the processor is configured to edit the scanning priority table for generating an updated scanning priority table, and the processor scans at least two transmission ports of the plurality of transmission ports according to the updated scanning priority table.

19. A scanning system comprising:
a display device comprising:
   a plurality of transmission ports configured to receive at least one data signal;
   a memory configured to save scanning data of the plurality of transmission ports; and
   a processor coupled to the plurality of transmission ports and the memory and configured to scan at least two transmission ports; and
a signal source coupled to at least one transmission port of the plurality of transmission ports and configured to generate the at least one data signal to the display device;

wherein the processor sorts a plurality of scanning time lengths of the plurality of transmission ports corresponding to at least two different protocols sequentially, generates a scanning priority table after the plurality of scanning time lengths of the plurality of transmission ports are sorted, and scans at least two transmission ports according to the scanning priority table, a scanning time length of each transmission port is a time difference between a first time of triggering a hot-plugging state of the each transmission port and a second time of stably receiving a data signal by the each transmission port, a transmission port with a higher priority has a shorter scanning time length, and a transmission port with a lower priority has a longer scanning time length; and wherein the plurality of transmission ports comprise a video graphics array (VGA) transmission port, the processor acquires a third time of triggering a hot-plugging state of the video graphics array transmission port, communicates with a signal source through the video graphics array transmission port by using a vertical synchronization signal, acquires a fourth time of stably receiving a data signal through the video graphics array transmission port, and acquires a scanning time length of the video graphics array transmission port according to a time difference between the third time and the fourth time; or wherein the plurality of transmission ports comprise a high definition multimedia interface (HDMI) transmission port, the processor acquires a fifth time of triggering a hot-plugging state of the high definition multimedia interface transmission port, communicates with a signal source through the high definition multimedia interface transmission port by using a clock signal carried by an inter-integrated circuit ($I^2C$) bus, acquires a sixth time of stably receiving a data signal through the high definition multimedia interface transmission port, and acquires a scanning time length of the high definition multimedia interface transmission port according to a time difference between the fifth time and the sixth time; or wherein the plurality of transmission ports comprise a display port (DP), the processor acquires a seventh time of triggering a hot-plugging state of the display port, communicates with a signal source through the display port by using a packet signal carried by an auxiliary channel, acquires an eighth time of stably receiving a data signal through the display port, and acquires a scanning time length of the display port according to a time difference between the seventh time and the eighth time.

* * * * *